| United States Patent [19] | [11] 3,950,130 |
| --- | --- |
| Renfrew et al. | [45] Apr. 13, 1976 |

[54] THIAZOLE-AZO DYES AND THE COLORATION OF POLYESTER TEXTILE FIBERS THEREWITH

[75] Inventors: Edgar Earl Renfrew; Henry Wolfgang Pons, both of Lock Haven, Pa.

[73] Assignee: American Aniline Products, Inc., Paterson, N.J.

[22] Filed: Dec. 7, 1973

[21] Appl. No.: 422,854

Related U.S. Application Data

[62] Division of Ser. No. 175,399, Aug. 26, 1971, abandoned.

[52] U.S. Cl. ................................ 8/41 C; 260/158
[51] Int. Cl.$^2$ .................... D06P 1/18; C09B 29/36
[58] Field of Search ..................... 8/41 C; 260/158

[56] References Cited
UNITED STATES PATENTS

| 3,515,714 | 6/1970 | Dale | 260/158 |
| --- | --- | --- | --- |
| 3,516,982 | 6/1970 | Dimroth | 260/206 |
| 3,579,497 | 5/1971 | Ramanathan | 260/158 |
| 3,639,384 | 2/1972 | Weaver | 260/158 |
| 3,640,995 | 2/1972 | Weaver | 260/207.1 |
| 3,642,767 | 2/1972 | Hahn | 260/158 |
| 3,685,952 | 8/1972 | Renfrew | 260/207 X |

*Primary Examiner*—Christopher A. Henderson, Jr.
*Attorney, Agent, or Firm*—Armstrong, Nikaido & Wegner

[57] ABSTRACT

Azo dyes for dyeing polyester fabric are made by coupling an appropriate diazotized amino heterocyclic base into an α-(N-alkylanilino)-m-toluene sulfonamide, typified by α-(N-ethyl anilino)-m-toluene sulfonamide. This class of azo dye, when appropriately dispersed, produces dyeings on aromatic polyester fabrics with excellent substantivity, outstanding sublimation fastness, and good fastness to light. The dyes are applied to polyesters, such as polyethylene terephthalate, by carrier dyeing, pressure dyeing, and thermofixation methods.

8 Claims, No Drawings

3,950,130

THIAZOLE-AZO DYES AND THE COLORATION OF POLYESTER TEXTILE FIBERS THEREWITH

This is a division, of application Ser. No. 175,399, filed Aug. 26, 1971 now abandoned.

BACKGROUND OF THE INVENTION

Among the polyester fibers, those based on polyethylene terephthalate continue to be the most important, although fibers based on 1,4-dimethylcyclohexane terephthalate have become commercially available. Developments in both homo- and copolyesters have continued and many modified versions of polyethylene terephthalate have recently appeared on the market. With the advent of new fibers, the search has continued for dyes which build up on the various types of polyester fabric proportionate to the amount of dye applied, and which are characterized by good light and excellent sublimation properties.

In polyethylene terephthalate fibers, the diffusion of the dye into the fiber is effectively controlled by the mobility of the chain molecules in the disordered regions. However, the molecular shape and the size of the dye, the presence of polar groups and general steric considerations are also important in relation to the rate of diffusion.

We have discovered certain water insoluble azo dyes that diffuse well into the now available polyester fibers. These dyes can be applied by any of the standard methods and the resulting dyeings are characterized by good light fastness and outstanding sublimation properties.

SUMMARY OF THE INVENTION

In accordance with the invention, there is provided a dye of the formula:

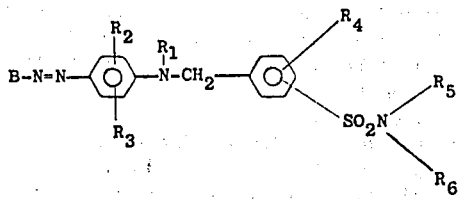

In the above formula, B is a member selected from the group consisting of

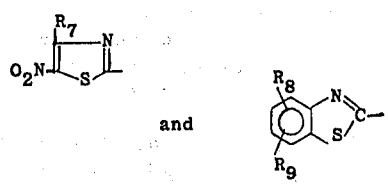

wherein
  $R_7$ is a member selected from the group consisting of hydrogen and methyl; and
  $R_8$ and $R_9$ are hydrogen, lower alkyl, lower alkoxy, halo, e.g., chloro and bromo, nitro, sulfamyl, N lower alkyl sulfamyl, N,N-(di lower alkyl)-sulfamyl, cyano, or lower alkyl sulfonyl.
  $R_1$ is lower alkyl, cyano lower alkyl or hydroxy lower alkyl and $R_2$, $R_3$, and $R_4$ are hydrogen, lower alkyl, lower alkoxy, chlorine or bromine. $R_5$ and $R_6$ are hydrogen, lower alkyl, cyano lower alkyl or hydroxy lower alkyl.

The dyes are applied by carrier dyeing, pressure dyeing and thermofixation, using standard methods.

The dyes are made in the conventional manner by adding a diazotized amino heterocyclic base to a solution of an appropriate coupling component.

Typical amino heterocycles useful as the diazotizable base in the coupling reaction are 2-amino-5-nitrothiazole, 2-amino-4-methyl-5-nitrothiazole, 2-aminobenzothiazole, 2-amino-6-ethoxybenzothiazole, 2-amino-6-methoxybenzothiazole, 2-amino-6-nitrobenzothiazole, 2-amino-5-methylbenzothiazole, 2-amino-4,6-dichlorobenzothiazole, 2-amino-6-sulfamylbenzothiazole, 2-amino-6-(N,N-dimethylsulfamyl)-benzothiazole, 2-amino-5-bromobenzothiazole, 2-amino-3-nitro-5-acetylthiophene, 2-amino-3-nitro-5-benzoylthiophene, and the like.

A diazonium salt solution of the amino heterocyclic base is prepared by dissolving sodium nitrite in concentrated sulfuric acid, heating to a temperature of about 60°–70°C, cooling the resulting solution to about 0°C and adding thereto first a mixture of acetic and propionic acid and thereafter the amino heterocyclic base. Alternatively, the amino heterocyclic base can be mixed with concentrated phosphoric acid, stirred to solution at temperatures up to 65°C, and cooled to below 0°C. To the cold solution nitrite and water are added dropwise with stirring, and this is followed by the addition by a small amount of dilute sulfamic acid.

Couplers useful in preparing the dyes are made by chlorosulfonation of a suitable tertiary amine, followed by reaction with ammonia, a primary aliphatic amine or a secondary aliphatic amine. Tertiary amine bases which are suitable for the chlorosulfonation reaction are made by the reaction between an N-alkylaniline and a benzyl halide. Particularly useful couplers include α-(N-methylanilino)-m-toluenesulfonamide, α-(N-ethylanilino)-m-toluenesulfonamide, α-(N-cyanoethylanilino)-m-toluenesulfonamide, α-(N,Methyl-m-toluidino)-m-toluenesulfonamide, α-(N-ethyl-o-chloroanilino)-m-toluenesulfonamide, α-(N-ethylanilino)-6-chloro-m-toluenesulfonamide, α-(N-methylanilino)-4-methoxy-m-toluenesulfonamide, N,N-dimethyl-α-(N-ethylanilino)-m-toluenesulfonamide, N-ethyl-α[N(2-cyanoethylanilino)]-m-toluenesulfonamide, N-(2-cyanoethyl)-αN-methylanilino)-m-toluenesulfonamide and N,N[di(2-hydroxyethyl)]-α-(N-ethylanilino)-m-toluenesulfonamide.

The structure of these other useful couplers are thus:

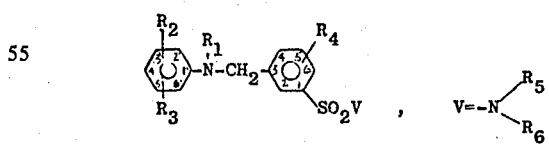

The 4'-position is unsubstituted since it must be available as a coupling site to be useful. The position of the sulfonamido group has been assigned by analogy with the sulfonic acid studies of Blanguy, L, H. E. Fierz-David, G. Stamm, Helv. Chim. Acta. 25 1162(1942) in which similar N-alkyl-N-arylbenzyl amines were sulfonated, yielding mainly the substituted m-toluenesulfonic acid, V=OH. However, other products were isolated and must represent other positions of the entering sulfo group. Thus, it is highly presumptive that chlorosulfonation behaves similarly, and certain amounts of sulfonamides of the structure are formed. They are useful couplers if the sulfonamide group is in the benzyl moiety.

It is possible to synthesize suitable N-alkylanilino-α-p-toluenesulfonamides by treating N-alkylanilines unsubstituted in the para position with α-chloro (or bromo)-p-toluenesulfonamide and their N-substituted and N, N-di substituted derivatives. The method is not as attractive economically or procedurally as in the chlorosulfonation method. Both series of couplers give dyes of the same excellent fastness ratings.

The azo dyestuffs used in the invention are made by the reaction of the diazotized amino heterocyclic base with the coupler by adding the diazonium salt to a cold aqueous solution of the coupler. The stirred mixture is allowed to react for 8–24 hours during which time the temperature rises to room temperature. The insoluble material is collected on a filter and washed acid free. The desired azo product is thus obtained in the form of a wet cake.

To prepare the product for application to the polyester substrates noted hereabove, it must be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and wetting agents may be added as desired, Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100°C (104°–212°F) to give a colored fiber containing 0.01–2 percent by weight dye (100% color basis).

Alternatively, dyeing may be accomplished without a carrier at temperatures of 100°–150°C under pressure.

Also, the dye may be applied in patterns by conventional printing methods, if desired.

The dye can be also applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220°C (356°–428°F) are used for 30 to 90 seconds. If the fabric contains cotton or viscose rayon, apart from synthetic fibers, there is little danger of damaging cellulosic portions, but if wool is present, the temperature must be kept within 180°–200°C and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

Our invention is further illustrated by the following examples:

EXAMPLE 1

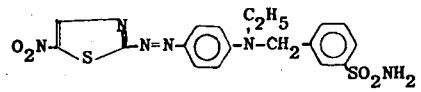

To a 500ml round bottom 4-neck flask equipped with a stirrer, a thermometer, a dropping funnel and an interchangeable heater and cooling bath was charged
175 g sulfuric acid, 66°Be. To it, no warmer than 10°–15°C was added
14.2 g sodium nitrite, the temperature being controlled by external cooling. The temperature was then raised to 65°C, and then cooled to 0°C, whereupon mixture of
160 g acetic acid and
27.5 g propionic acid was added below 3°C. This was followed by the portionwise addition of
29.0 g 2-amino-5-nitrothiazole at 0°–2°C. The mixture was stirred for two hours at 0°–3°C.

A solution was prepared by dissolving
58.0 g α-(N-ethylanilino)-m-toluenesulfonamide at 65°C in a solution made from
500 ml water and
55. g hydrochloric acid, 32%.

The solution was cooled externally below 30°, and ice was added to bring the temperature to 0°C or below. To it at 0° to -5°C was added the prepared cold diazo solution.

The mixture was stirred for 16 hours, during which time the temperature was allowed to rise to that of the room. The insoluble material was then collected on a filter, washed with water until the washings were neutral to Congo Red paper, and dried. It weighed 67.5 g mp. 181°–183°C.

To a ball mill was charged
60 g monoazo dye base,
58 g dispersant (a commercially available product, "Lignosol FTA", described as a sodium lignin sulfonate material) and
282 ml water. Milling was continued until filtration tests showed that a suitable dispersion had been achieved.

EXAMPLE 2

An aqueous dye bath containing 10% Marcron L (a commercially available phenolic dye carrier) and 1% monosodium phosphate as a buffering agent was prepared. Type 54 "Dacron" polyester fabric was treated in a bath at 120°C for 10 minutes, the fabric-to-water dye bath ratio being 1 : 40. The disperse dye made as described in Example 1 was added in an amount sufficient to provide a bath containing 0.4% dye based on the weight of polyester fibers. Dyeing was continued for one hour at 205°F and the fabric was removed from the bath, rinsed and dried. Sample dyeings were tested for sublimation according to standard AATCC Color Fastness to Dry Heat (sublimation) Test No. 117–1967T, Page 123 of the 1970 Technical Manual of the American Association of Textile Chemists and Colorists. Dyed fabric was placed between a sandwich of undyed "Dacron" polyester fabric and heat was applied for 30 seconds. Sublimation tests were made at 350°F and 400°F on goods as described above. The dyeing was characterized by bright violet hue. Sublimation tests showed substantially no transfer of color, even at 400°F.

Similar excellent results were obtained when the dye was applied to the fabric by thermofixation methods and then tested for sublimation as described above.

The dyeings were also tested for light fastness by subjecting them to carbon arc fading in accordance with AATCC. Color Fastness to Light, Carbon Arc Lamp, Continuous Light Test No. 16A-1964, as detailed on p. 127, of the 1970 Technical Manual of the AATCC. The dyeings showed only a very slight break at 20 hours' exposure, indicating good fastness to light.

EXAMPLE 3

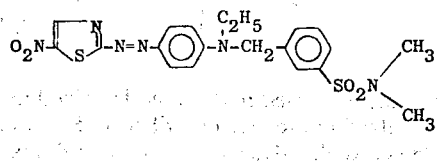

A diazonium salt solution prepared in exactly the manner described in Example 1 was added to a solution of 63.6 g N,N-dimethyl-α[N(ethylanilino)]-m-toluenesulfonamide in the same amount and strength of dilute hydrochloric acid described in Example 1. Coupling, isolation and dispersion were carried out in the same way as Example 1.

Dyeing in the way described in Example 2 yielded bright violet dyeings of properties like those of the product of Example 1 as dyed in Example 2.

EXAMPLE 4

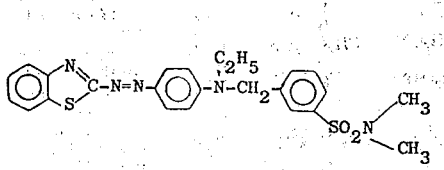

To a 1 l. beaker was charged
450 g phosphoric acid, 85% and
30.0 g 2-aminobenzothiazole. Stirring at temperatures up to 65°C produced solution. The contents were cooled to −2°C by the application of an external brine-ice bath.

To the cold solution with stirring was added dropwise a solution of
14.0 g sodium nitrite in
200 ml water over ninety minutes, during which time the temperature was maintained at −2° to 3°C. Stirring the cold solution was continued for another 2 ½ hours. Then was added a solution made of
2.0 g sulfamic acid in
18.0 g water.

The cold diazonium solution was added slowly to a previously prepared cold solution of
63.9 g N,N-dimethyl-α-[N(ethylanilino)]-m-toluenesulfonamide in
1000 ml water containing
55 g hydrochloric acid, 32%, the solution having been prepared in the way indicated in Example 3.

Stirring was continued for 16 hours, during which time the temperature of the reaction mixture was allowed to rise to that of the room. The mass was then heated to 65°C, stirred briefly, and filtered. The cake was washed with water until the washings were neutral to Congo Red paper. The cake was preserved moist. The yield indicated by drying a small portion was 76 g. (80%) mp 150°–154°C.

The cake was milled with sufficient water and dispersing agent to yield a paste containing 15.9% azo dye base and 16% dispersing agent. (The dispersing agent was a commercially available lignin sulfonic acid material, "Reax 85A".)

The disperse dye was applied to polyester fabric in the manner described in Example 2. Dyeings showed a bright orange hue of excellent properties. Sublimation resistance was excellent at 400°F.

EXAMPLE 5

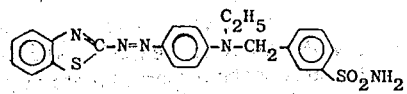

A diazonium solution of 2-aminobenzothiazole prepared as described in Example 4 was coupled to 58.0 g of α-(N-ethylanilino)-m-toluenesulfonamide contained in a dilute hydrochloric acid solution made in the way described in Example 4. The azp dye base was isolated and dispersed as described in Example 4, and dyed in the manner of Example 2. Dyeings were similar in hue and properties to those of Example 4.

EXAMPLE 6

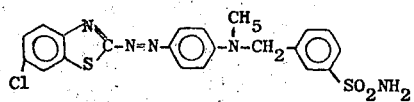

In the manner described in Example 4, but using 37.1 g 6-chloro-2-aminobenzothiazole instead of 300 g 2- aminobenzothiazole, diazotization was carried out. This was coupled with 58.0 α-(N-ethylanilino)-m-toluenesulfonamide contained in a solution prepared as indicated in Example 5. Coupling conditions, isolation of the monoazo base, and its dispersion with "Lignosol FTA" to a 15% paste were carried out in the was described in Example 4.

Dyeings made in the manner of Example 2 showed a bright reddish-yellow hue. The dye was especially suitable for application by thermofix methods. Properties were excellent, especially in sublimation tests in which there was no transfer at 350°F, and virtually none at 400°F.

EXAMPLE 7

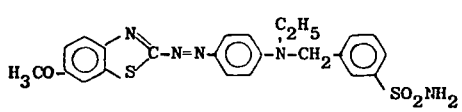

In the manner described in Example 5, but using 36.0 g 6-methoxy-2-aminobenzothiazole (provided by 38.1 g of 94.6% pure material) in place of 2-aminobenzothiazole, a dye of the indicated structure was prepared. Dyeings of the dispersed material, made in the ways described in Example 2, showed a bright reddish hue. The sublimation resistance was excellent, showing virtually no transfer at 400°F. Light fastness was inferior to the product of Example 5, but was within the useful range for textile purposes.

EXAMPLE 8

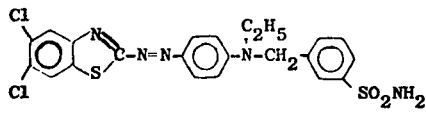

In the manner described in Example 5, but using 43.8g 5,6-dichloro-2-aminobenzothiazole in place of 2-aminobenzothiazole, a dye of the indicated structure was prepared. Dyeings of the dispersed material, made in the ways described in Example 2, showed a bright red hue. The standard textile tests showed the dyeings to have good to excellent properties; sublimation was excellent at 400°F, for instance.

EXAMPLE 9

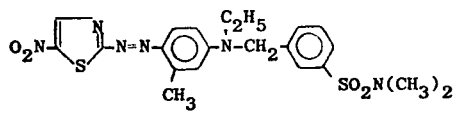

2-Amino-5-nitrothiazole, treated in exactly the same proportion by the same conditions as those described in Example 1, was coupled in the manner of Example 1 to 66.4 g N,N-dimethyl-α-[N-(ethyl-m-toluidino]-m-toluenesulfonamide, handled in the way described for α-(N-ethylanilino)-m-toluenesulfonamide in Example 1. The azo product was isolated and then dispersed to a paste in the way described in Example 1. Dyeings made by the ways of Example 2 yielded a reddish-blue hue. Tests showed the dyeings to have at least moderate light fastness, and all have excellent sublimation fastness.

EXAMPLES 10 to 28

The following dyes are made in the way described in Example 1.

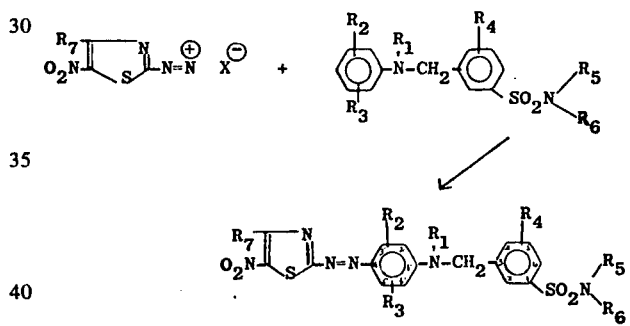

When suitably dispersed in the way described in Example 1, and dyed in the way described in Example 2, they yield violet to blue dyeings on polyester fibers and fabrics. Properties of the dyeings are good to excellent, with sublimation fastness particularly outstanding.

| EX | $R_1$ | $R_2$ | $R_3$ | $R_4$ | $R_5$ | $R_6$ | $R_7$ | Hue on Polyester |
|---|---|---|---|---|---|---|---|---|
| 10 | $C_2H_5$ | H | H | H | $CH_3$ | H | H | Bluish-Violet |
| 11 | $C_2H_5$ | H | H | H | H | $CH_3$ | H | Bluish-Violet |
| 12 | $C_2H_5$ | H | H· | H | H | $CH_3$ | $CH_3$ | Bluish-Violet |
| 13 | $CH_2CH_2OH$ | H | H | H | H | H | H | Bluish-Violet |
| 14 | $CH_3$ | 2'-Cl | 5'-$CH_3$ | H | $CH_3$ | $CH_3$ | H | Blue |
| 15 | $CH_2CH_2OH$ | 3'-$OH_3$ | H | H | $C_2H_5$ | H | H | Reddish-Blue |
| 16 | $CH_2CH_2CN$ | 3'-$CH_3$ | H | H | H | H | H | Reddish-Blue |
| 17 | $CH_2CH_2CN$ | 3'-$C_2H_5$ | H | H | H | H | H | Reddish-Blue |
| 18 | $CH_3$ | 3'-Br | H | H | H | H | H | Bluish-Violet |
| 19 | $CH_2CH_2CN$ | 3'-$OCH_3$ | H | H | —$CH_3$ | H | H | Blue |
| 20 | $C_2H_5$ | H | H | 6-$CH_3$ | H | H | H | Bluish-Violet |
| 21 | $CH_3$ | H | H | H | —$CH_2CH_2CN$ | —$CH_2CH_2CN$ | H | Bluish-Violet |
| 22 | $C_2H_5$ | H | H | 6-Cl | H | H | H | Bluish-Violet |
| 23 | $C_2H_5$ | H | H | H | $CH_2CH_2OH$ | H | H | Bluish-Violet |
| 24 | $C_2H_5$ | 2'-$CH_3$ | 5'-$CH_3$ | H | $CH_3$ | $CH_3$ | H | Blue |
| 25 | $C_2H_5$ | 2'-$OCH_3$ | 5'-$CH_3$ | H | H | H | H | Blue |
| 26 | $CH_3$ | H | H | H | $CH_2CH_2OH$ | $CH_2CH_2OH$ | $CH_3$ | Bluish-Violet |
| 27 | $C_2H_5$ | H | H | 6-Br | H | H | H | Bluish-Violet |
| 28 | $C_2H_5$ | 2'-$OCH_3$ | 5'-$OCH_3$ | H | $CH_3$ | H | $CH_3$ | Blue |

EXAMPLEs 29 to 58

The following dyes are made by the method detailed in Example 4.

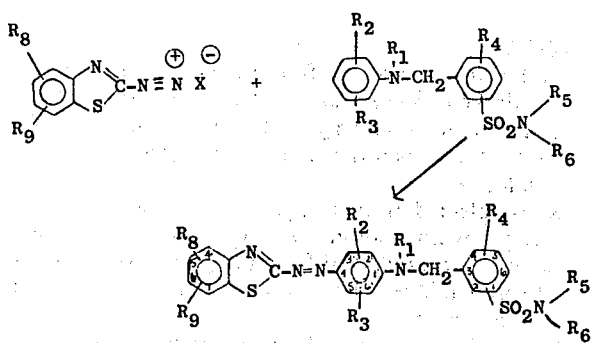

The products, when suitably dispersed in the way described in Example 4, are applied to polyester fibers and fabrics and fabrics in the way described in Example 2. All show acceptable properties, and all are exceptionally resistant to standard sublimation tests even at 400°F.

| EX | $R_1$ | $R_2$ | $R_3$ | $R_4$ | $R_5$ | $R_6$ | $R_8$ | $R_9$ | Hue |
|---|---|---|---|---|---|---|---|---|---|
| 29 | $CH_3$ | H | H | H | H | H | H | H | Orange |
| 30 | $C_2H_5$ | 3'-$CH_3$ | H | H | H | H | H | H | Red-Orange |
| 31 | $CH_2CH_2CN$ | H | H | H | $CH_3$ | $CH_3$ | H | H | Orange |
| 32 | $CH_2CH_2CH_3$ | 5'-$CH_3$ | 5'-$CH_3$ | H | $C_2H_5$ | H | H | H | Red-Orange |
| 33 | $C_2H_5$ | 2'-$OCH_3$ | 5'-$CH_3$ | H | $CH_3$ | H | 6-Cl | H | Red-Orange |
| 34 | $C_2H_5$ | H | H | H | H | H | 6-$SO_2NH_2$ | H | Yellow-Red |
| 35 | $CH_2CH_2OH$ | H | H | H | $CH_2CH_2CN$ | H | H | H | Orange |
| 36 | $C_2H_5$ | 3'-$CH_3$ | H | H | H | H | 6-$OCH_3$ | H | Red |
| 37 | $C_2H_5$ | 2'-Cl | 5'-Cl | H | H | H | H | H | Red-Orange |
| 38 | $C_2H_5$ | H | H | 6-$CH_3$ | H | H | H | H | Orange |
| 39 | $C_2H_5$ | 3'-Br | H | H | H | H | 6-$SO_2CH_3$ | H | Red |
| 40 | $C_2H_5$ | H | H | H | H | H | 4-$NO_2$ | 6-$NO_2$ | Bluish-Red |
| 41 | $C_2H_5$ | H | H | H | H | H | 6-$SO_2NHCH_3$ | H | Yellow-Red |
| 42 | $C_2H_5$ | H | H | H | $CH_2CH_2CN$ | $CH_2CH_2CN$ | 6-$OC_2H_5$ | H | Red |
| 43 | $C_2H_5$ | H | H | 4-$CH_3$ | H | H | 4-$CH_3$ | H | Red-Orange |
| 44 | $C_2H_5$ | 2'-Cl | 5'-$CH_3$ | H | H | H | H | H | Yellow-Red |
| 45 | $CH_3$ | H | H | H | H | H | 6-$OCH_3$ | H | Red |
| 46 | $CH_3$ | 3'-Br | H | H | H | H | 6-$CH_3$ | H | Red-Orange |
| 47 | $C_2H_5$ | 3'-$CH_3$ | H | H | H | H | 5-$CH_3$ | H | Red-Orange |
| 48 | $C_2H_5$ | H | H | H | H | H | 4-Cl | 6-$NO_2$ | Bluish-Red |
| 49 | $CH_2CH_2CN$ | 3'-$C_2H_5$ | H | 6-$CH_3$ | H | H | 6-$SO_2$⟨⟩ | H | Bluish-Red |
| 50 | $CH_2CH_2CN$ | 3'-$CH_3$ | H | H | H | H | 6-$NO_2$ | H | Bluish-Red |
| 51 | $CH_3$ | H | H | H | H | H | 4-$CH_3$ | 6-$CH_3$ | Yellow-Red |
| 52 | $CH_3$ | H | H | H | H | H | 4-$CH_3$ | 6-Cl | Yellow-Red |
| 53 | $C_2H_5$ | H | H | 6-Cl | H | H | 6-$SO_2NHCH_3$ | H | Red-Orange |
| 54 | $C_2H_5$ | H | H | H | $CH_3$ | H | 4-$OCH_3$ | 7-$OCH_3$ | Red |
| 55 | $C_2H_5$ | H | H | 6-Br | $CH_2CH_2OH$ | H | H | H | Orange |
| 56 | $CH_2CH_2OH$ | H | H | 6-Cl | $CH_3$ | $CH_3$ | H | H | Orange |
| 57 | $C_2H_5$ | H | H | 3-$OCH_3$ | $CH_2CH_2OH$ | $CH_2CH_2OH$ | 6-Br | H | Red-Orange |
| 58 | $C_2H_5$ | 3'-$CH_3$ | H | 6-Cl | H | H | 6-$SO_2$⟨⟩ | H | Red-Orange |

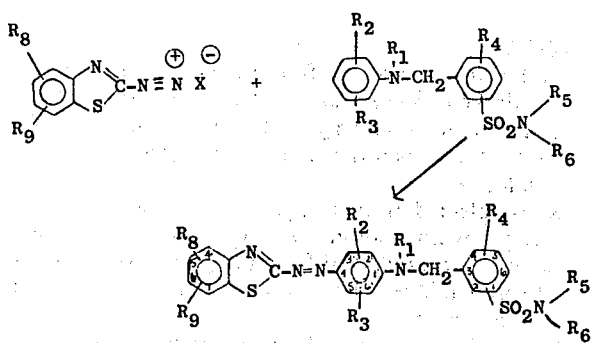

and wherein
$R_7$ is selected from the group consisting of hydrogen and methyl, and
$R_8$ and $R_9$ are independently selected from a group consisting of hydrogen, lower alkyl, lower alkoxy, chloro, bromo, nitro, sulfamyl, N lower alkyl sulfamyl, N,N-(di-lower-alkyl)sulfamyl, cyano and lower alkyl sulfonyl;
$R_1$ is selected from the group consisting of lower alkyl, hydroxy lower alkyl, and cyano lower alkyl;
$R_2$, $R_3$, and $R_4$ are independently selected from the group consisting of hydrogen, lower alkyl, lower alkoxy, chlorine and bromine; and

What is claimed is:
1. Polyester dyed with a compound of the formula:

wherein B is selected from the group consisting of $R_5$ and $R_6$ are independently selected from the group consisting of hydrogen, lower alkyl, cyano lower alkyl and hydroxy lower alkyl.
2. Polyester of claim 1 dyed with a compound of the formula:

wherein
R_7 is selected from the group consisting of hydrogen and methyl;
R_1 is selected from the group consisting of lower alkyl, hydroxy lower alkyl, and cyano lower alkyl;
R_2, R_3, and R_4 are independently selected from the group consisting of hydrogen, lower alkyl, lower alkoxy, chlorine, and bromine; and
R_5 and R_6 are independently selected from the group consisting of hydrogen, lower alkyl, cyano lower alkyl, and hydroxy lower alkyl.

3. Polyester of claim 2 wherein $R_2$, $R_3$, $R_4$, $R_5$ and $R_6$ are hydrogen, R is ethyl, and $SO_2NR_5R_6$ is in the meta position.

4. Polyester of claim 2 wherein $R_2$, $R_3$, $R_4$, and $R_7$ are hydrogen, $R_5$ and $R_6$ are methyl, $R_1$ is ethyl, and $SO_2NR_5R_6$ is in the meta position.

5. Polyester of claim 2 wherein $R_2$, $R_4$, and $R_7$ are hydrogen, $R_3$, $R_5$, and $R_6$ are methyl, R is ethyl, and $SO_2NR_5R_6$ is in the meta position.

6. Polyester of claim 1 wherein said compound is of the formula

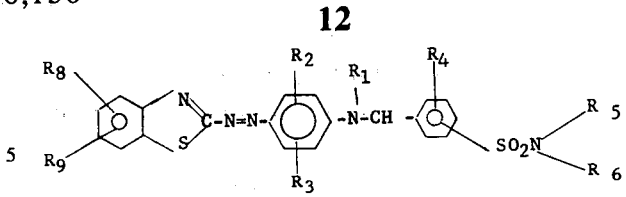

wherein
R_8 and R_9 are selected from the group consisting of hydrogen, lower alkyl, lower alkoxy, chloro, bromo, nitro, sulfamyl, N,N-(di-lower alkyl) sulfamyl, N lower alkyl sulfamyl, cyano and lower alkyl sulfonyl;
R_1 is selected from the group consisting of lower alkyl, hydroxy lower alkyl, and cyano lower alkyl;
R_2, R_3, R_4 are selected from the group consisting of hydrogen, lower alkyl, lower alkoxy, chlorine, and bromine; and
R_5 and R_6 are selected from the group consisting of hydrogen, lower alkyl, cyano, lower alkyl, and hydroxy lower alkyl.

7. Polyester of claim 6 wherein $R_2$, $R_3$, $R_4$, $R_5$, $R_6$, $R_8$, and $R_9$ are hydrogen, $R_1$ is ethyl, and $-SO_2NR_5R_6$ is in the meta position.

8. Polyester of claim 6 wherein $R_2$, $R_3$, $R_4$, $R_8$, and $R_9$ are hydrogen, $R_5$ and $R_6$ are methyl, $R_1$ is ethyl, and $-SO_2NR_5R_6$ is in the meta position.

* * * * *